United States Patent [19]

Spykerman

[11] Patent Number: 5,800,011
[45] Date of Patent: Sep. 1, 1998

[54] EXPANDABLE CONTAINER HOLDER

[75] Inventor: David J. Spykerman, Holland, Mich.

[73] Assignee: Prince Corporation, Holland, Mich.

[21] Appl. No.: 818,951

[22] Filed: Mar. 17, 1997

[51] Int. Cl.$^6$ .................................................. A47C 7/62
[52] U.S. Cl. ........................ 297/188.19; 297/188.01;
297/188.14; 297/188.15; 297/188.16; 248/311.2
[58] Field of Search ..................... 297/188.19, 188.01,
297/188.14, 188.15, 188.16; 248/311.2

[56] References Cited

U.S. PATENT DOCUMENTS

| | | |
|---|---|---|
| 4,728,018 | 3/1988 | Parker . |
| 4,799,638 | 1/1989 | Allen ........................ 248/311.2 |
| 4,854,468 | 8/1989 | Dahlquist, II et al. . |
| 4,877,164 | 10/1989 | Baucom . |
| 5,024,411 | 6/1991 | Elwell ........................ 248/311.2 |
| 5,072,989 | 12/1991 | Spykerman et al. ........ 297/188.19 X |
| 5,096,152 | 3/1992 | Christiansen et al. ...... 297/188.19 X |
| 5,104,184 | 4/1992 | Kwasnik et al. ........... 297/188.19 X |
| 5,259,580 | 11/1993 | Anderson et al. ........... 248/311.2 |
| 5,284,314 | 2/1994 | Misaras et al. ............. 248/311.2 |
| 5,628,486 | 5/1997 | Rossman et al. ............ 248/311.2 |
| 5,673,890 | 10/1997 | Duesterberg ............... 248/311.2 |
| 5,673,891 | 10/1997 | Fujihara et al. ........... 297/188.17 X |

*Primary Examiner*—Peter M. Cuomo
*Assistant Examiner*—Rodney B. White
*Attorney, Agent, or Firm*—Price, Heneveld, Cooper, DeWitt & Litton

[57] ABSTRACT

A container holder has a fixed arcuate housing and an arcuate arm which is pivotally mounted to the fixed housing. The pivoted arm includes a first spring to move the pivot arm from a stored position to a use position and a second spring urging the pivot arm toward the fixed housing. The pivot arm includes a tapered entry surface such that a container deflects the pivoted arm as it is adjustably held to move the pivoted arm to a desired diameter corresponding to that of the cylindrical diameter of the container inserted therein. In one embodiment, a pivoted bail extends beneath the aperture defined by the fixed housing and pivoted arm which lockably engages an end of the pivoted arm with a force determined by the weight of the container positioned on the supporting bail.

20 Claims, 3 Drawing Sheets

EXPANDABLE CONTAINER HOLDER

BACKGROUND OF THE INVENTION

The present invention relates to an expandable cupholder and one which provides an adjustable locking force at an adjusted position as a function of the weight of the container positioned therein.

Expandable cupholders are well-known in which spring-biasing forces on arcuate pivot arms allow different diameter containers to be held within the container holder. U.S. Pat. No. 5,072,989 discloses a container holder with spring-biased arcuate arms which allow the arms to engage the sidewall of containers, although not specifically for different diameter containers. Its spring-loaded pivot arms allow some degree of adjustment to accommodate different diameter containers. It is necessary for the spring to provide sufficient holding force such that the container held therein is securely held during movement of the vehicle. On the other hand, if the spring force is excessive, the container cannot be easily inserted into the container holder and could result in the puncturing, for example, of the wall of a Styrofoam® type container. In order to accommodate different sized containers, many container holders of the past have used flexible resilient Poron® flaps extending inwardly from the edges of a relatively large diameter circular container holder to, in effect, provide an opening with an adjustable diameter for accommodating different size containers.

Although these approaches have provided for some accommodation of different size containers, they do not do so in a manner which both allows the easy insertion and removal of different size containers as well as securely hold the containers in position during movement of the vehicle.

SUMMARY OF THE PRESENT INVENTION

Thus, there exists a need for a container holder which overcomes the deficiencies of the prior art container holders by providing an adjustable aperture which can be moved with relative ease during insertion of containers of different sizes to engage the sidewall of the container and when the container is inserted, hold the container with sufficient force to securely hold the container and still allow its easy removal.

The container holder of the present invention accommodates these requirements by providing a container holder having a fixed arcuate housing and an arcuate arm which is pivotally mounted to the fixed housing. The pivoted arm includes a first spring for opening the arm from a stored position and a tapered entry surface such that a container can deflect the pivoted arm and is adjustably held to move the pivoted arm to a desired diameter corresponding to that of the cylindrical diameter of the container inserted therein by a second spring. In one embodiment, the pivoted arm is selectively, lockably held in a plurality of adjusted positions by a pivoted bail member extending beneath the aperture defined by the fixed housing and pivoted arm which lockably engages an end of the pivoted arm with a force determined by the weight of the container positioned on the supporting bail. As a container bottom engages the bail, the locking force of the bail on the pivoted arm holds the arm in a container holding position with a force directly related to the weight of the container, therefore, holding heavier containers with a greater force than required with lighter containers.

In a preferred embodiment of the invention, the pivoted arm includes a detent in a position spaced from the pivot connection of the pivoted arm to the fixed arm and the pivoted bail includes a plurality of interlocking members in spaced relationship and selectively engaging the detent to allow the pivoted room to move to a number of arcuately pivoted positions and be selectively held by the force of the interlocking members with the detent as a container is positioned on the bail.

The resultant container structure provides a relatively inexpensive adjustable container holder which allows the easy insertion and removal of containers therein and, in one embodiment, securely holds the containers with a force as necessary which is a function of the weight of the containers inserted therein.

These and other features, objects and advantages of the present invention will become apparent upon reading the following description thereof together with reference to the accompanying drawings.

DETAILED DESCRIPTION OF THE PREFERRED EMBODIMENT

Figure 1:
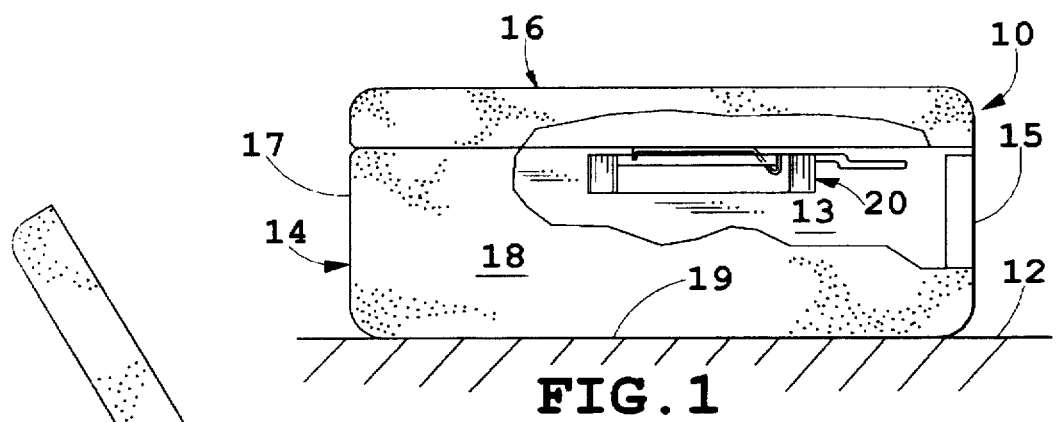
FIG. 1 is a right side elevational view of a vehicle armrest, shown partly broken away to show the container holder of the present invention in a first or stored position.
Figure 2:
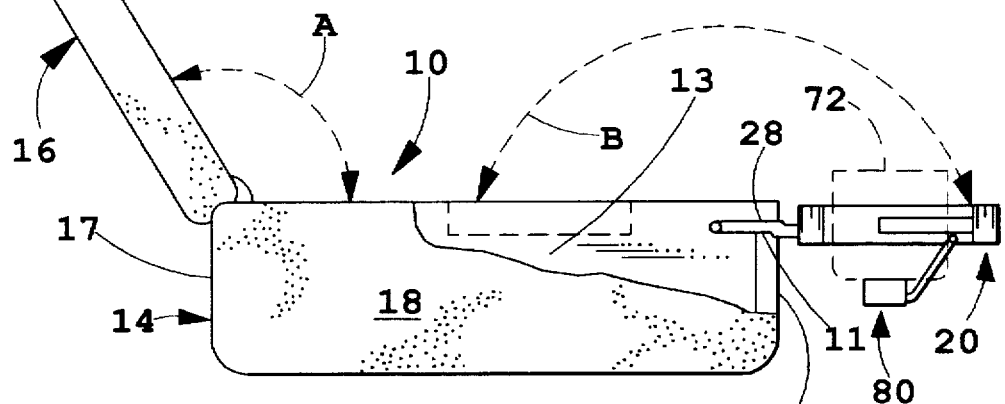
FIG. 2 is a right side elevational view of the armrest shown in FIG. 1, showing the container in its second or extended use position.

Referring initially to FIGS. 1 and 2, there is shown an armrest 10 schematically shown mounted to the floor 12 of a vehicle, such as an automobile. The armrest includes a housing 14 and a pivoted cover 16 which moves between a closed position, shown in FIG. 1, enclosing the lower housing 14 to an open position pivoted in the direction indicated by an arrow A in FIG. 2 to open the armrest and allow a container holder assembly 20 to be pivoted from the stored position, shown in FIG. 1, to a use position, shown in FIG. 2. The armrest housing 14 includes front and rear walls 15, 17, respectively, right and left sidewalls 18 and a floor 19, which is suitably secured to the floor of the vehicle 12 and may be pivotally secured thereto by pivot brackets if it is desired to move the armrest from a lowered use position, as seen in FIG. 1, to a raised position between, for example, vehicle seats. In such case, the cover 16 includes a latch mechanism for securing the cover 16 to the housing 14 when moved between horizontal and vertical positions.

The container holder assembly 20 is pivotally mounted between the inner surfaces of the sidewalls 18 of the housing 14 of armrest 10 to be pivotally movable between a stored position within the compartment 13 defined by housing 14, as seen in FIG. 1, and an extended use position pivoting in an arc illustrated by arrow B in FIG. 2 between the stored and use positions.

Figure 3:
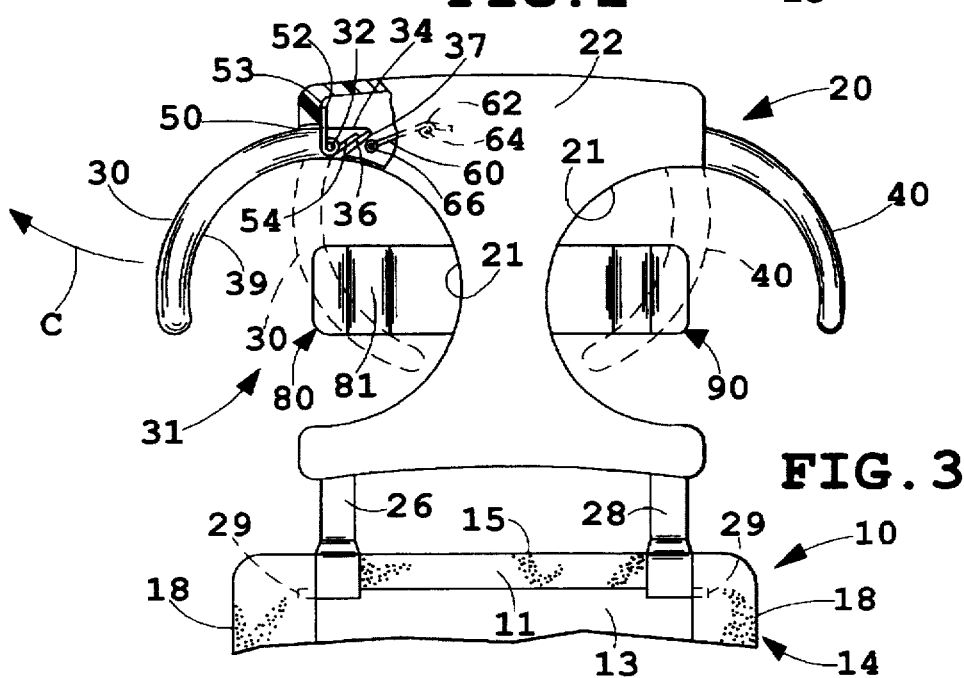
FIG. 3 is an enlarged top plan view, partly broken away, of one embodiment of the container holder shown in FIGS. 1 and 2.
Figure 4:
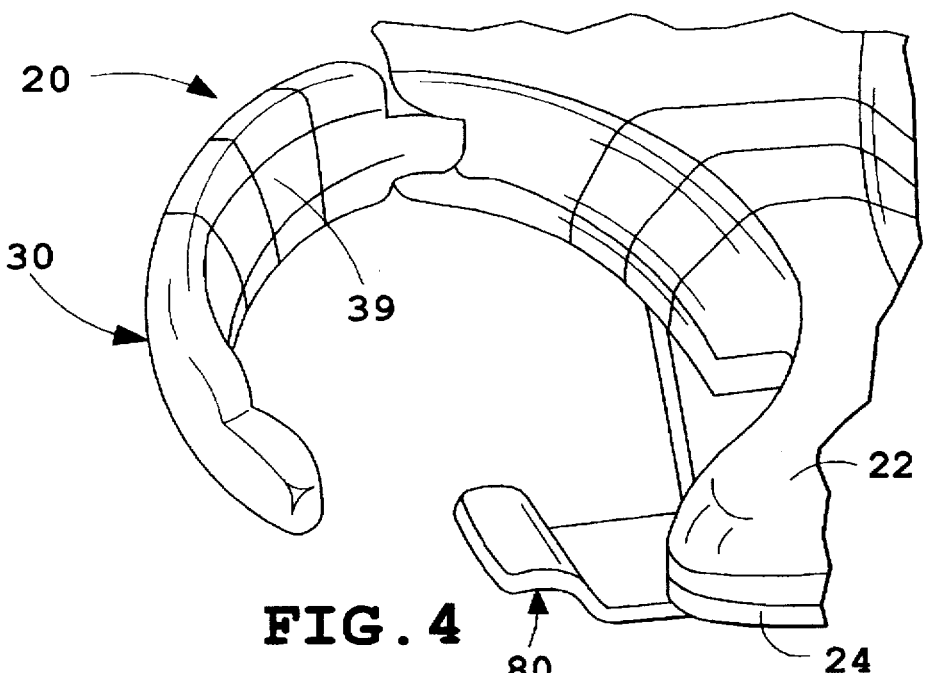
FIG. 4 is an enlarged fragmentary perspective view of one side of the container holder shown in FIG. 3.

As seen in FIG. 3, the container holder is a dual container holder for containing soda cans, coffee mugs, or other drink containers for either the driver or passenger when the armrest is mounted between the vehicle seats. As seen in FIGS. 3 and 4, the container holder 20 includes an upper horizontally extending housing 22 and a lower housing 24 which are joined together and between which there is mounted a pair of spring-loaded arcuate arms 30, 40 which pivot between a collapsed stored position, shown in phantom form in FIG. 3, to an expanded first use position, as indicated in solid lines in FIG. 3. The container holder 20 is pivotally mounted within the compartment 13 of the vehicle armrest by means of a pair of arms 26, 28 mounted to the lower housing 24. Each arm 26, 28 includes pivot pin 29 which is pivotally received in a socket formed on each of the inside surfaces of sidewall 18 of the armrest. The front wall 15 of the armrest includes a step-cut ledge 11 for supporting the arms 26, 28 holding the container holder 20 in a generally horizontal position with respect to the armrest as seen in FIG. 2.

Each of the arcuate pivot arms 30 and 40 are pivotally mounted between the upper and lower housings 22 and 24 by means of a pivot pin 32 extending through an aperture in a first end 34 of each of the arms, it being understood that arm 40 includes corresponding mirror image structure so that only arm 30 is discussed in detail. The upper and lower housings 22, 24 define an arcuate surface 21 shaped to conform generally to the curvature of a container sidewall, thus, having a radius of curvature somewhat greater than that of most containers to be held by the container holder. Each of the curved arms 30, 40 also have a similar radius of curvature and circumscribe an arc of approximately 90° with the arcuate surface 21 formed by housings 22 and 24 circumscribing an arc of approximately 180°, thereby leaving an opening 31 (FIG. 3) for accommodating the handle of, for example, a coffee mug or the like inserted into the container holder.

Figures 5, 6:
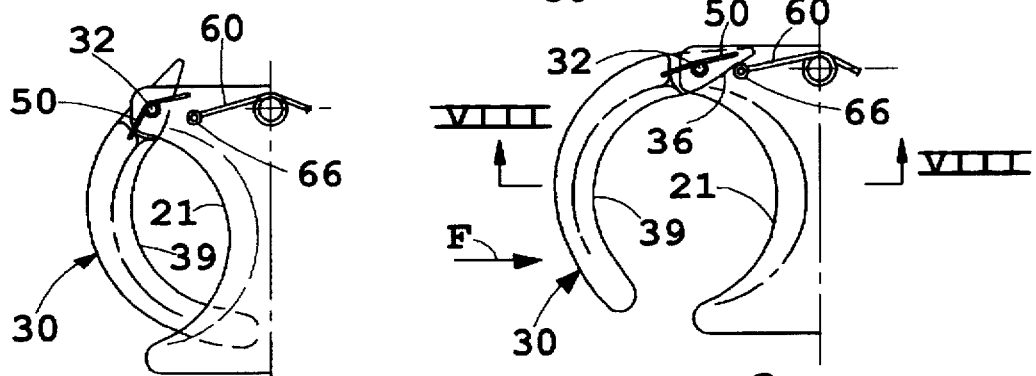
FIG. 5 is a fragmentary top schematic view of one of the container holders shown in FIG. 4, shown in a stored position.
FIG. 6 is a fragmentary top schematic view of one of the container holders shown in FIG. 5, shown in a first use position.
Figure 7:
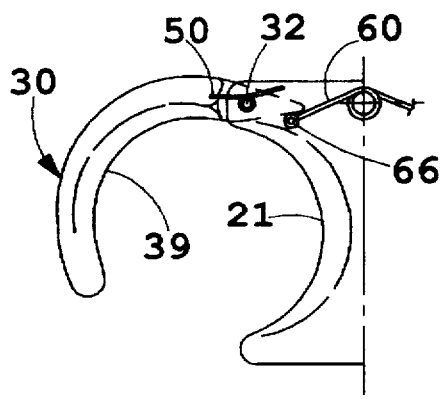
FIG. 7 is a fragmentary top schematic view of a container holder, shown in a second expanded use position.
Figure 8:
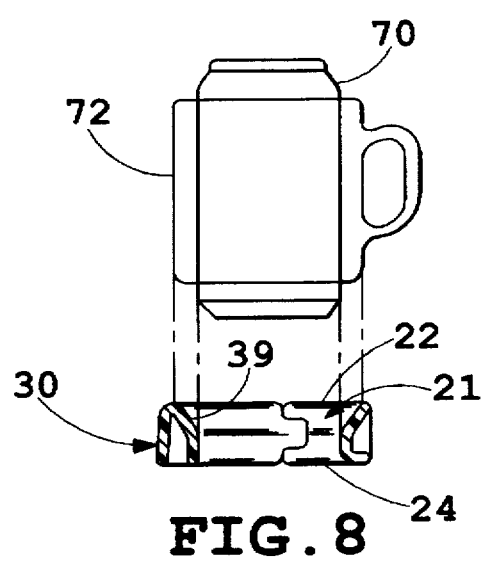
FIG. 8 is a side elevational view of the container holder shown in FIGS. 1–7 with the container holder shown in fragmentary cross section to illustrate the expandability for different sized containers.

The arms 30 and 40 are spring-loaded by a first or kick-out spring 50 which includes an end 52 which engages an inner sidewall 53 (FIG. 3) of the housings 22, 24 and an opposite end 54 which engages a lip 36 on the end 34 of arm 30 such that as the curved arm 30 clears the sidewalls 18 of the compartment 13 of the armrest housing 14, the arms will be spring-loaded outwardly to a first use position illustrated in FIGS. 3 and 6. Spring 50 surrounds pivot pin 32 and, as can be seen in FIG. 3, will disengage from sidewall 53 as arm 30 pivots outwardly in a direction of arrow C. A second spring 60 has one end 62 fixedly mounted between housings 22 and 24 by means of an anchor post 64 and an opposite end which includes a roller 66 which engages the outer edge 37 of pivoted arm 30 to apply a force on the arm 30 on the side opposite pivot pin 32 sufficient to urge arm 30 against the kick-out pressure force of spring 50 once the arm is extended such that the inner edge 39 of the arm will remain in engagement with a container inserted therein. The inner surface 39 of each of the arms is tapered, as seen in FIG. 8, such that containers, such as a soda can 70 or coffee mug 72 will cam open the pivoted arm to allow easy insertion of the containers therein. Each of the sides of the container holders 20 include a pivot-down bail 80 and 90, respectively, which, in one embodiment as will be described in greater detail below in connection with FIG. 9, provide an interlocking adjustable connection to the pivot arms 30 and 40 for holding the arms in a desired adjusted position with a force as a function of the weight of the container inserted therein.

The pivot arms 30, 40 may be coupled to the upper and lower housings 22 and 24 such that they are automatically extended and retracted utilizing a rack and gear assembly or other mechanism, if desired, as disclosed in U.S. Pat. No. 5,072,989, issued Dec. 17, 1991, the disclosure of which is incorporated herein by reference. In the manual construction shown in FIGS. 3–8, however, the arms are depressed inwardly as the container holder is stored within compartment 13 and no such automatic extension/retraction mechanism is necessary.

As the container holder 20 is pivoted from the storage position, the kick-out spring 50 initially moves the container holder from the stored position, shown in FIG. 5, to the first use position, shown in FIG. 6, in which the roller 66 attached to spring 60 engages edge 36 of arm 30 to provide a resilient force indicated by arrow F in FIG. 6 against smaller diameter containers such as soda cans which can be inserted within the opening urging inner sidewall 39 of arm 30 outwardly to react against holding force F. As can be seen, the kick-out spring 50 no longer provides a force on arm 30 once the container holder has been moved to an open position, after which the second spring 60 provides a force which tends to hold arm 30 inwardly against a container sidewall. The spring 60 is selected such that containers can be easily inserted and removed from the container holder while at the same time providing a force F sufficient to hold the containers in place during movement of the vehicle. In order to improve the holding ability of the container holder as a function of the weight of the container, such as can 70 or coffee mug 72, a unique bail and pivot arm interlocking structure can be employed and is now described in connection with FIG. 9.

Figure 9:
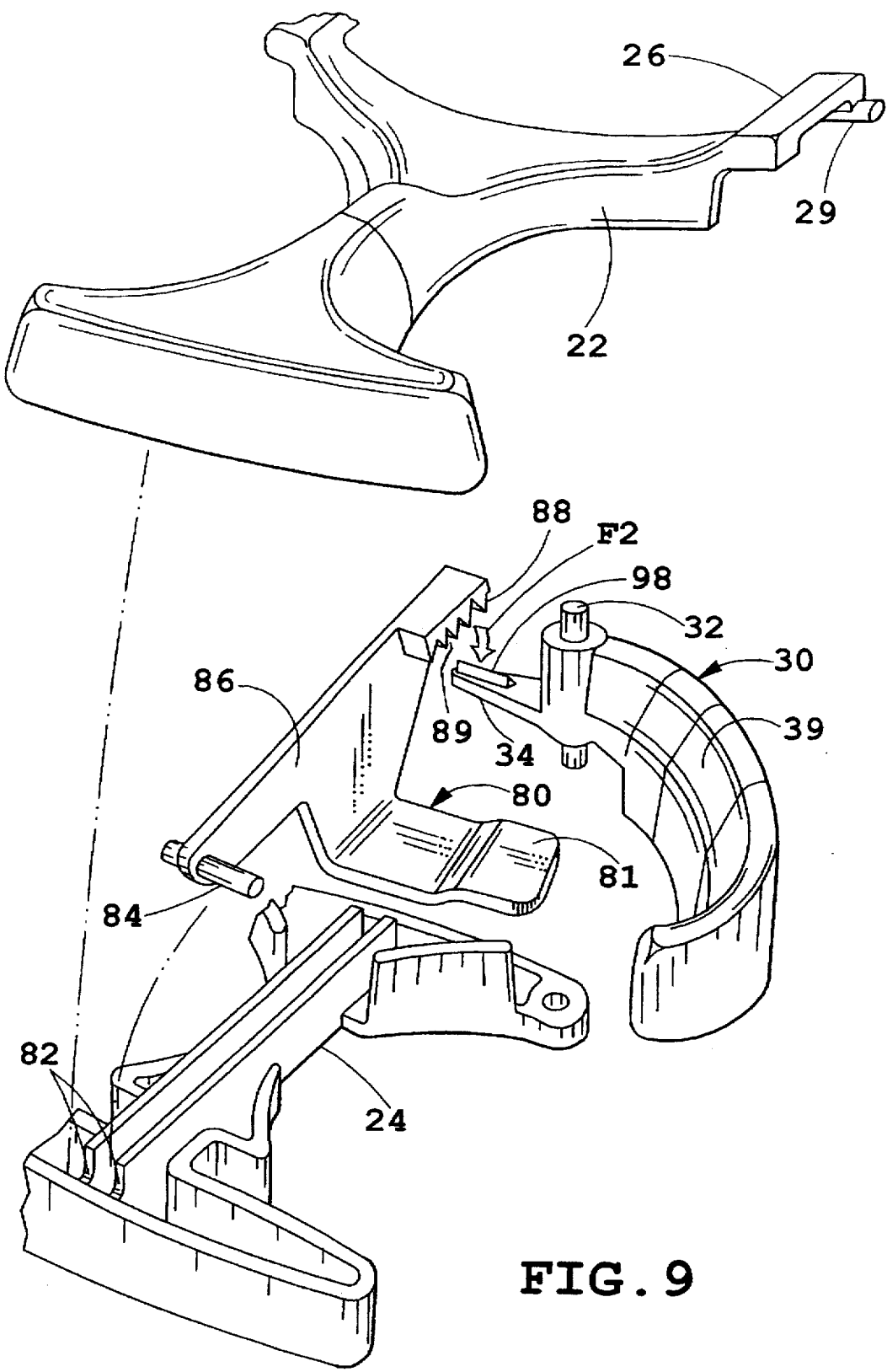
FIG. 9 is an enlarged exploded fragmentary perspective view of the container holder of an embodiment of the present invention showing the details of an interlocking bail and arm assembly.

In FIG. 9, the pivot mounting of the arm 30 with respect to the upper and lower housings 22 and 24 is reversed, illustrating that the pivot arms 30 and 40 can be pivoted from either the front or rear of the upper and lower housing sections 22 and 24 as desired. The upper and lower housings 22, 24 are shown in exploded form (FIG. 9) and include mating semicylindrical sockets 82 for receiving a generally horizontally extending pivot pin 84 of a bail 80, which has a generally horizontally extending platform 81 for supporting the bottom of a container positioned thereon. The bail, thus, is pivotally mounted to move, preferably by gravity, between a raised position coplanar with the housing halves 22, 24, as seen in FIG. 1, and a pivoted-down lowered use position, as seen in FIG. 2. The bail is freely pivoted under the force of gravity and includes a main body 86 with pivot pin 84 being mounted to one end and a plurality of triangular ratchet teeth 88 extending downwardly from the opposite end, which is positioned above end 34 of arm 30 to selectively engage a detent 98 formed on the top surface of extending end 34 of arm 30. For sake of clarity, the springs 50, 60 are not shown and can be mounted to the under surface of end 34 of arm 30 to provide clearance for the interengagement of the ratchet teeth 88 and detent 98. As can be appreciated, the bail 80 itself has little weight and, therefore, the triangular upwardly extending detent 98, which is shaped to interfit within the triangular slots 89 of ratchet teeth 88, provides little holding force as when the container holder is unloaded. Thus, as the container holder pivots from a stored position shown in FIG. 1 to the use position in FIG. 2, the upwardly extending detent 98 rides easily through the slots 89 to the first position shown in FIG. 6 under the influence of kick-out spring 50. As a container, such as a soda can 70, is positioned on the support platform 81 of bail 80, however, a downwardly extending force F2 is presented with force F2 being directly related to the weight of the container placed therein. Thus, as a container is positioned within the spring-biased pivoted arm 30, it will urge the tapered edge 39 of arm 30 initially to the desired diameter for holding the container therein which, once resting upon bail support surface 81, will exert a holding force F2 preventing the arm 30 from expanding outwardly during movement of the vehicle such as through turns or the like. Force F2 increases with full containers and is reduced with empty containers and provides a variable locking force between pivoting arm 30 in housing 22, 24 and the bail 80 to hold the selectively adjustable arm in the correct diameter configuration for a container inserted therein. Since the weight of the container itself controls the amount of locking force, the locking force is automatically adjusted to increase the adjusted held position of the arm as required for different weight containers as their contents are consumed. This feature, although shown in conjunction with the spring-loaded construction of FIGS. 1–8, could be used in a number of other adjustable container holder configurations including manually adjusted ones without springs, as also illustrated in FIG. 9.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A container holder comprising:
   a housing defining at least in part an opening for receiving a container therein;
   an arcuate arm pivotally mounted to said housing and further defining said opening for at least partially circumscribing a container positioned between said arm and said housing;
   a bail pivotally mounted to said housing and including a surface extending under said opening defined by said arm and said housing for supporting the floor of a container positioned therein;
   a first spring for moving said arm from a collapsed position adjacent said housing to a first extended position, said first spring disengaging said arm when said arm is in an extended position; and
   a second spring extending between said arm and said housing for urging said arm toward said housing such that said arm provides a biasing force against a container positioned between said arm and housing.

2. The container holder as defined in claim 1 and further including interlocking means for locking said arm in a selected position, said interlocking means providing a locking force on said arm wherein the weight of a container positioned on said bail increases the locking force on said arm.

3. A container holder comprising:
   a housing defining at least in part a container sidewall engaging support;
   an arm pivotally mounted to said housing and defining at least in part a container sidewall engaging member, said arm pivotally mounted to said housing for movement between different positions defining larger and smaller openings between said arm and housing for different sized containers; and
   a bail pivotally mounted to said housing and including an interlocking member engaging said arm such that when a container is positioned in said container holder to engage said bail, the weight of the container locks said arm in an adjusted position.

4. The container holder as defined in claim 3 wherein said interlocking member includes a plurality of teeth.

5. The container holder as defined in claim 4 wherein said arm includes at least one tooth for interengaging said teeth of said bail.

6. A container holder comprising:
   a housing defining a container sidewall engaging arcuate surface;
   an arcuate arm pivotally mounted to said housing for at least partially circumscribing a container positioned between said arm and said housing;
   a first spring for moving said arcuate arm from a position adjacent said housing to a first extended position, said first spring disengaging said arcuate arm when said arm is in an extended position; and
   a second spring extending between said arcuate arm and said housing for urging said arcuate arm toward said housing such that said arcuate arm provides a biasing force against the side of a container positioned between said arcuate arm and said housing.

7. The container holder as defined in claim 6 and further including a bail pivotally mounted to said housing and including a member interlocking said arcuate arm such that when a container is positioned in said container holder to engage said bail, the weight of the container locks said arcuate arm in an adjusted position.

8. The container holder as defined in claim 7 wherein said interlocking member includes a plurality of teeth.

9. The container holder as defined in claim 8 wherein said arcuate arm includes at least one tooth positioned to selectively engage said teeth of said bail.

10. A container holder comprising:
    a housing defining an arcuate edge for engaging the side of a container;
    an arcuate arm pivotally mounted to said housing for at least partially circumscribing a container positioned between said arm and said housing;
    a bail pivotally mounted to said housing including a surface extending under an opening defined by said arm and housing for supporting the floor of a container positioned therein; and
    a spring extending between said arm and said housing for urging said arcuate arm toward said housing such that said arm provides a biasing force against a container positioned between said arm and housing, wherein said arcuate arm has a tapered edge to allow a container to urge said arcuate arm away from said housing, and wherein said arcuate arm and bail include interlocking means for selectively locking said arcuate arm in a selected position when the weight of a container positioned on said bail provides a locking force between said bail and said arm.

11. The container holder as defined in claim 10 wherein said interlocking means comprises interengaging teeth on said bail and said arcuate arm.

12. A container holder comprising:
    a housing defining at least in part an opening for receiving a container therein;

an arcuate arm pivotally mounted to said housing and further defining said opening for at least partially circumscribing a container positioned between said arm and said housing;

a bail pivotally mounted to said housing and including a surface extending under said opening defined by said arm and housing for supporting the floor of a container positioned therein;

a first spring for moving said arcuate arm from a stored position adjacent said housing to a first extended position, said first spring disengaging said arm when said arm is in an extended position; and a second spring extending between said arm and said housing for urging said arm toward said housing such that said arm provides a biasing force against a container positioned between said arm and housing, wherein said arcuate arm and bail include interlocking teeth means for selectively locking said arcuate arm in a selected position with the weight of a container positioned on said bail increasing the locking force between said bail and said arm.

13. The container holder as defined in claim 12 wherein said housing defines an arcuate container engaging edge.

14. The container holder as defined in claim 13 wherein said arcuate arm has a tapered edge to allow a container to urge said arcuate arm away from said housing.

15. The container holder as defined in claim 14 wherein said edge of said housing is tapered to facilitate the insertion of a container therein.

16. The container holder as defined in claim 15 wherein said arcuate arm and said housing define a gap permitting the handle of a container to extend therethrough.

17. The container holder as defined in claim 16 wherein said housing is defined by upper and lower sections which are joined together and said bail and said arcuate arm are pivotally mounted between said housing sections.

18. An armrest for a vehicle comprising:

a housing defining a storage compartment;

a cover pivotally mounted to said housing to selectively enclose said compartment; and a container holder pivotally mounted to said housing for movement between a stored position within said housing and a use position extended from said housing, said container holder comprising a housing defining at least in part a container sidewall engaging support, an arm pivotally mounted to said housing and defining at least in part a container sidewall engaging member, said arm pivotally mounted to said housing for movement between different positions defining larger and smaller openings between said arm and housing for different sized containers, and a bail pivotally mounted to said housing and including an interlocking member engaging said arm such that when a container is positioned in said container holder to engage said bail, the weight of the container locks said arm in an adjusted position.

19. The armrest as defined in claim 18 wherein said interlocking member includes a plurality of teeth.

20. The armrest as defined in claim 19 wherein said arm includes at least one tooth for engaging said plurality of teeth.

* * * * *